United States Patent
Chapman et al.

(10) Patent No.: US 10,126,131 B2
(45) Date of Patent: Nov. 13, 2018

(54) AUTOMATED PHOTOVOLTAIC GEOSPATIAL LOCATION

(71) Applicant: Enphase Energy, Inc., Petaluma, CA (US)

(72) Inventors: Patrick L. Chapman, Austin, TX (US); Julianne Frances Haugh, Austin, TX (US); Kelly Mekechuk, Austin, TX (US); Eric Roesinger, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 379 days.

(21) Appl. No.: 14/922,915

(22) Filed: Oct. 26, 2015

(65) Prior Publication Data

US 2017/0115119 A1 Apr. 27, 2017

(51) Int. Cl.
  *G01C 21/20* (2006.01)
  *H02S 50/15* (2014.01)
  *H02S 50/00* (2014.01)

(52) U.S. Cl.
  CPC .............. *G01C 21/20* (2013.01); *H02S 50/00* (2013.01); *H02S 50/15* (2014.12)

(58) Field of Classification Search
  CPC ......... H02J 3/383; H02J 3/385; H04L 43/065; Y04S 10/123; G01C 21/20; H02S 50/15; H02S 50/00
  USPC ............................................................ 702/1
  See application file for complete search history.

(56) References Cited

U.S. PATENT DOCUMENTS

| | | | |
|---|---|---|---|
| 7,873,490 B2 * | 1/2011 | MacDonald | G01J 1/4228 250/200 |
| 8,284,574 B2 | 10/2012 | Chapman et al. | |
| 8,767,421 B2 | 7/2014 | Chapman | |
| 2006/0137736 A1 * | 6/2006 | Nishitani | G06Q 10/04 136/251 |
| 2009/0050192 A1 * | 2/2009 | Tanaka | F24J 2/38 136/246 |
| 2009/0234692 A1 | 9/2009 | Powell et al. | |
| 2009/0320827 A1 | 12/2009 | Thompson et al. | |
| 2010/0102201 A1 | 4/2010 | Sherman | |
| 2010/0185333 A1 * | 7/2010 | Oosting | F24J 2/38 700/279 |

(Continued)

FOREIGN PATENT DOCUMENTS

WO  WO2005026628 A1  3/2005

OTHER PUBLICATIONS

International Search Report and Written Opinion, International Application: PCT/US2016/058623, dated Jan. 24, 2017.

(Continued)

*Primary Examiner* — Roy Y Yi
*Assistant Examiner* — Jeffrey Aiello
(74) *Attorney, Agent, or Firm* — Moser Taboada

(57) ABSTRACT

Location functionality to determine the geospatial location of a PV module is described. This functionality may be performed at the PV module site itself as well as remote from the PV module site. The location functionality may involve the analysis of data collected from the location of the PV module or modules being analyzed as well as data from locations of other PV modules, which are not being analyzed. This data, from other PV modules may be gathered, recorded, and used as a benchmark, or for some other purpose in embodiments.

20 Claims, 9 Drawing Sheets

(56) References Cited

U.S. PATENT DOCUMENTS

| | | | |
|---|---|---|---|
| 2012/0012101 A1* | 1/2012 | Trujillo | F24J 2/38 126/601 |
| 2012/0125401 A1* | 5/2012 | DeVillier | F24J 2/38 136/246 |
| 2012/0158362 A1* | 6/2012 | Vandevelde | F24J 2/38 702/183 |
| 2013/0221753 A1* | 8/2013 | Perreault | G05F 1/571 307/77 |
| 2013/0314699 A1* | 11/2013 | Jungerman | G01J 1/0266 356/139.01 |
| 2015/0012258 A1 | 1/2015 | Caine | |
| 2015/0188415 A1* | 7/2015 | Abido | H02M 3/005 307/103 |

OTHER PUBLICATIONS

Gilbert M. Masters, Renewable and Efficient Electric Power Systems, Wiley Interscience, 2004.

\* cited by examiner

AUTOMATED PHOTOVOLTAIC GEOSPATIAL LOCATION

BACKGROUND

Photovoltaic ("PV") cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

PV systems can include devices to convert the direct current ("DC") electricity from solar panels into alternating current ("AC") electricity. This AC may be manipulated and processed such that it can be accepted by a public power grid, used locally by an operator of a PV system, and transmitted for offsite use. The manipulation and processing of the voltage from the PV system for subsequent use can be carried out under supervised conditions, controlled operations, and with the use of software and hardware management implementations. These management implementations may control and/or monitor the PV system or its operation or both.

The location and orientation of PV modules of a PV system can affect the amount of solar irradiation each solar cell of a PV module is exposed to and, therefore, the amount of subsequent voltage generated by the individual cells, the PV modules, and the PV system as a whole. Location can include where in a PV system a PV module is positioned and what latitude and longitude the PV system is installed at. Orientation can be described as an angle of tilt away from pure horizontal (an x-axis) a PV module has or a pitch along the face of a PV module or both. Both the location and orientation of a PV module can affect the angle at which sunlight will strike the cells of the PV module, e.g., at a pure perpendicular angle or something other than ninety degrees, and, therefore the how much voltage will be generated by the PV module during incident sunlight.

DETAILED DESCRIPTION

Figure 1:
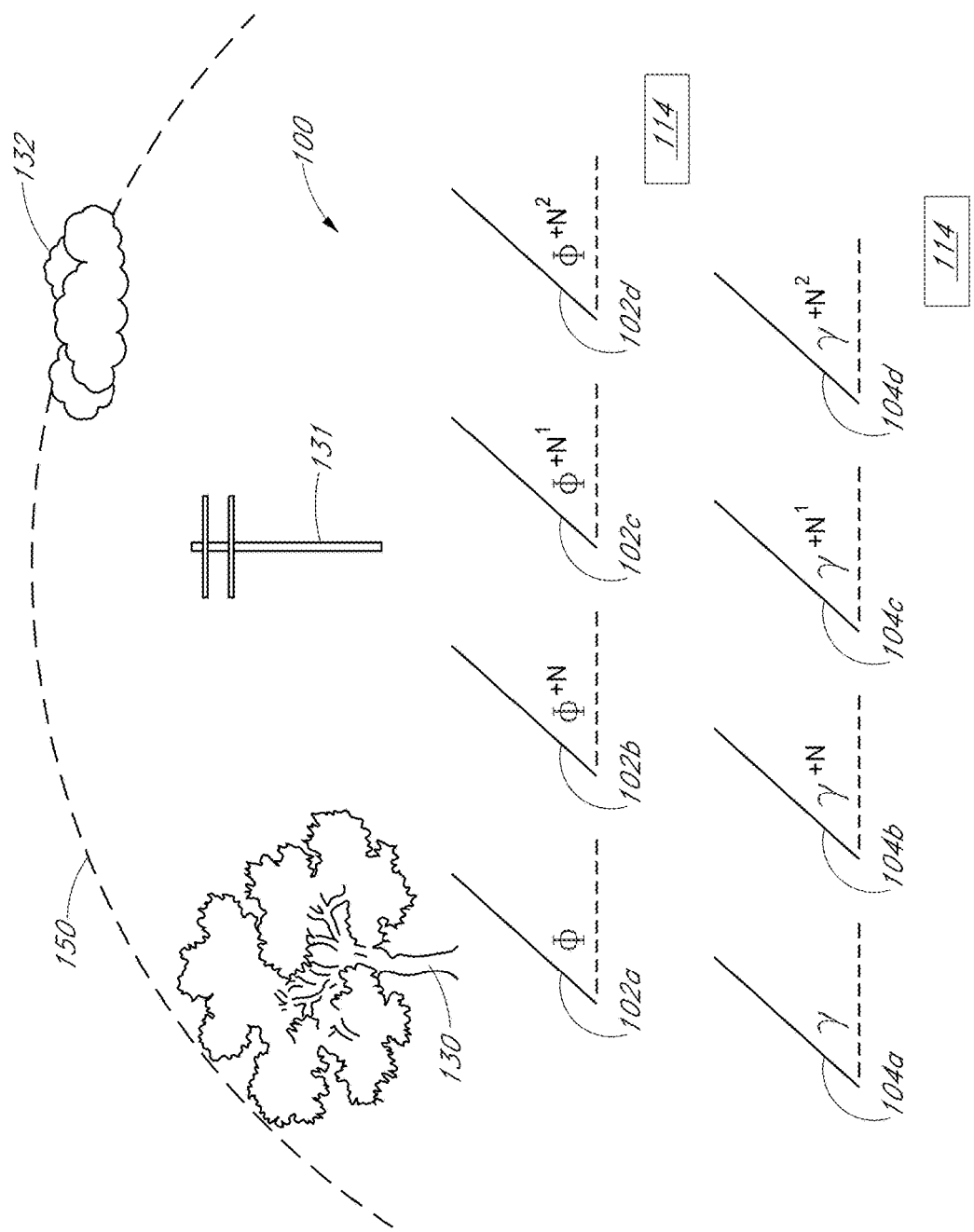
FIG. 1 illustrates a plurality of PV modules that may each be geospatially located in accord with some embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment," "a disclosed embodiment," or "an embodiment." The appearances of the phrases "in one embodiment" "in a disclosed embodiment," or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising."—This term is open-ended. As used in the appended claims, this term does not foreclose additional structure or steps.

"Configured To."—Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc.—As used herein, these terms are used as labels for nouns that they precede, and do not imply any type of ordering (e.g., spatial, temporal, logical, etc.). For example, reference to a "first" solar cell does not necessarily imply that this solar cell is the first solar cell in a sequence; instead the term "first" is used to differentiate this solar cell from another solar cell (e.g., a "second" solar cell). Likewise, the term "at least one" includes one or more than one.

"Based On."—As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Embodiments can include processes, machines, and manufactures and can be directed to automated geospatial location of PV modules as well as various uses of a determined geospatial location for a PV module. In embodiments, location functionality to determine the geospatial location of a PV module may be performed at the PV module site itself as well as remote from the PV module site. In embodiments, the location functionality may involve the analysis of data collected from the location of the PV module or modules being analyzed as well as data from locations of other PV modules, which are not being analyzed. Data, from the PV module and other PV modules may be gathered, recorded, and used as benchmarks, or for some other purpose in embodiments. For example, systems and processes of embodiments may use data for calibration or recalibration of the geospatial location of one or more PV modules of an installed or to be installed PV module system. The data may also be used for operational analysis and to improve operational settings of the PV modules being analyzed as well as PV modules sharing similar characteristics with those being analyzed.

Techniques and systems may be employed in embodiments such that the geospatial location of a PV module may be verified during or after installation. Determinations of location may also be used for various purposes including for both the operation of and for operational analysis of PV modules, for determinations regarding anticipated PV module output for a certain installation, and for feasibility of a certain installation at time of installation and subsequent to installation.

Embodiments may also include methods for remotely verifying geographic coordinates of installed and operational photovoltaic cells where the methods can include repeated cycles of identification and recordation of PV module output. In a first cycle, for example, one or more microprocessors may repeatedly identify and record one or more of the voltage output, the power output, the current output, and the cell temperature of a first array of photovoltaic cells. These microprocessors may also identify and associate the time of day to the first cycle and its gathered data. And, in a different cycle, before or after the first cycle, one or more microprocessors may, likewise, repeatedly identify and record one or more of the voltage output, the power output, the current output, and the cell temperature of the same array of photovoltaic cells. As with the first cycle, one or more of the microprocessors, may identify and associate the time of day to this other time cycle and its gathered data. The recording and analysis may then be used to determine the latitude and the longitude or other geospatial identifiers of one or more PV modules. Other determinations may also be made, include the efficiency or anticipated efficiency of a PV module, and operational settings for these same PV modules.

Embodiments may also include comparing a determined latitude and longitude of one or more PV modules with a geographic location of a PV module or array identified by an installer and using one or more of the recorded outputs, recorded temperature, and identified and associated time of day for the two time cycles to determine the latitude and the longitude of the PV modules, and to determine an installation angle of one or more PV modules. The difference between the determined latitude and longitude of the first array of photovoltaic cells, with coordinates previously associated with the first array of photovoltaic cells, may also be used to adjust the operating mode of a transformer circuit from a first output mode to a second output mode. The first output mode may be previously tailored to accommodate expected solar radiation for the previously determined latitude and longitude of the first array of photovoltaic cells and the second output mode may be selected to accommodate expected solar radiation for the revised latitude and longitude of the first array of photovoltaic cells. In some embodiments, these output modes, for module level power electronics ("MLPE") of the PV modules, may be selected from modes comprising: a full power mode, a pulse mode, a jog mode, and a run mode.

Embodiments may also include processes for managing operation of an array of photovoltaic cells where, within one or more microprocessors, repeatedly identified and stored one or more of voltage output, power output, current output, and cell temperature for a first array of photovoltaic cells may be used to remotely locate the geographic position of the first photovoltaic array; and within one or more microprocessors, the located geographic position may be used to identify expected multiple extrema in a maximum power point tracking ("MPPT") operation associated with the first photovoltaic array. In embodiments, an MPPT operation may be performed at a MLPE device that may be configured to periodically sweep a power curve for detection of multiple extrema along that curve. In this example, as well as elsewhere, expected multiple extrema may indicate high-sun and low-sun parameters used for tuning an MPPT operation.

In these foregoing embodiments, as well as other embodiments below and elsewhere, one or more of the voltage output, the power output, the current output, and the cell temperature for arrays of photovoltaic cells may be measured at a gateway or a microinverter and the sampling rate for the outputs and the temperature at these of other devices may be once every fifteen minutes or faster. The gateway may provide for sampling every few minutes while the microinverter may provide for sampling at a much faster rate, in the kilohertz range, for example.

In embodiments PV module outputs may be measured and then used to determine other outputs of a PV module. For example, voltage and power may be used to determine current.

Embodiments may also be comprised of devices and systems performing functions that can include using repeatedly sampled and stored voltage output, power output, current output, and cell temperature of a first array of photovoltaic cells to remotely locate the geographic position of the first photovoltaic array; and using the located geographic position to identify expected multiple extrema in a MPPT operation for the first photovoltaic array. These systems and devices may also perform the various other functions described above and herein.

Embodiments can include PV systems with MLPE devices that can offer the capability to monitor module-level data such as voltage, current and the temperature of a given PV module. Such systems, with MLPE devices, may include systems with microinverters, alternating current photovoltaic ("ACPV") modules, or dc-dc optimizers. In embodiments, these components may be used in a PV module to convert the DC electricity from the solar panels into AC electricity. In embodiments, some MLPE devices may also couple to a gateway device, or communications unit, such that MLPE data can be aggregated and analyzed for performance, reliability, customer service and the like. The module data may be accessed locally at the site of the PV system or via a network, such as the Internet. Data from more than one module, or even numerous modules, may also be generated in systems of MLPE devices. Site data and module-to-module comparison data may also be available, gathered, analyzed, and acted upon in embodiments. Gateway devices, systems, and methods may provide this functionality and additional functionality, such as, for example, logging and time-stamping data as it is received or is otherwise available to it.

Embodiments may include gateways, which may also be referred to as a power manager, and may be its own separate device within a PV system apart from the MLPE devices, however, the gateway and its functionality may also be incorporated into MLPE devices or other components of the PV system or across components of the PV system. Preferably, a gateway system can communicate over a network, such as the Internet, as well communicate locally to and within the PV system, including the microinverters or other associated electronics at the MLPE devices. This communication functionality may allow a gateway to execute techniques, processes, methods, and the like to improve performance or add functions to the PV system. These functions may include those discussed herein and below.

In embodiments, location determinations may be used to identify a dominant mode of operation for MLPE devices of the PV system. These determined dominant modes may be used for purposes of overriding errant operational modes caused by local exceptions such as shading, clouding, and uncalibrated sunsets. As mentioned above, location determinations may also be used with sweeping determinations for MPPT operations and error identifications. For example, revised location determinations or shared location expectations, may be used to sweep power curves being used to identify MPPT extremes or errors in MLPE operation, through estimates or targets tailored for the specific location or for similar locations. Thus, location services can be helpful for onsite as well as remote trouble shooting of PV systems. Location services of embodiments may also be helpful where an installed address is not indicated of the actual location of a PV module. This may occur when installation sites are very large, as in industrial applications, as well as, when P.O. boxes or other imprecise addresses are used to manually identify the installation address of a PV module.

As explained in more detail below, the location functionality may be built into a gateway device or across several MLPE devices as well as be a standalone component suited to be added at the time of installation or later on. When locations determinations are made, verification may also be conducted through the use of internet protocol ("IP") addresses or space-based geolocation system (e.g., Global Positioning System ("GPS"), Russian Global Navigation Satellite System ("GLONASS"), etc.). In other words, a gateway or other device may identify the location of a PV module using the collected data described herein and may then compare this calculated location with an assigned IP address and the address's presumed location. Alternatively or additionally, this calculated location may be compared to a geolocation (e.g., a GPS location) determined by the installer at the time of installation. This rough verification can be used as an initial test to verify the accuracy of a determined geospatial location and whether or not a fundamental flaw exists in the IP address or the determined geospatial location. Likewise, the determined geospatial address can serve to confirm the IP address as well as information assigned to the PV module at the time of installation. For example, the determined geospatial location can confirm installation location, installation orientation, and expected performance models for the location. Embodiments may also eliminate the need for installers to log or otherwise assign the location and orientation of PV modules when being installed as this information may be determined remotely and may even be used to confirm installation and a PV system becoming operational.

Determined location services may also be used for operational estimates of sunrise and sunset for a PV module. When cloud cover or another anomaly renders determination of the time of sunset or sunrise difficult or impossible, when using operational data such as PV module voltage output or PV module temperature, embodiments may be used to confirm location and assign specific sunrise or sunset times from similarly situated PV modules. Similarly, these verifications may also be employed when data filtering techniques of outputs of a PV module are not useful and the output data remains incomprehensible. Thus, an absent sunrise or sunset time or incomprehensible output data may trigger a verification of PV module location, which in turn scans for similarly situated PV modules and then assigns a missing time out expected output ratings using data from similarly situated PV modules, e.g., a PV module sharing similar geospatial location indices.

PV modules and gateways employing embodiments may also transmit specific identifiers that may be helpful to locate installed and reinstalled otherwise relocated PV modules. For example, an identifier for a specific PV module may be sent along with output and time data to be used for locating the position and operational status of the PV module. This identifier may be used to confirm the location of the PV module or to identify that it has been brought back online in a different location. This location reporting functionality, can, therefore, detect theft or other unknown removal and relocation.

Still further, the stored outputs of the PV modules, and the calculated locations, may be helpful for weather prediction purposes, ground change indications, e.g., earthquake, device deterioration, e.g., broken installation brackets, and for remote population as well.

FIG. 1 shows a PV system 100 installation including PV modules $102_a$-$102_d$ and $104_a$-$104_d$. Also labeled are fixed obstacles 130 and 131 and movable obstacle 132. Gateways 114 are shown and are associated with an array of PV modules each. Finally, the expected position of the sun during a certain day is shown by dotted lines 150. As the sun moves across the sky along this line 150 the PV modules may receive direct, partial, or no sunlight depending upon the relative position of the sun and any intervening obstacle between the sun and the receiving surface of the PV module. The gateways may see voltage from the PV modules and may monitor this voltage along with other operational data for management and reporting purposes. The installation angles for PV modules 102 are shown with the symbol $\phi$ and the installation angles of PV modules 104 are shown with the symbol $\gamma$. Each of these angles may be the same for all of the PV modules and may also be slightly adjusted between the two rows of PV modules 102 and 104. Moreover, the angles may also be adjusted in each PV module array as is shown by the notation $^{+N, +N1}$ etc. These slight adjustments may be to accommodate for large systems with many PV modules or for other reasons as well.

Figure 2:
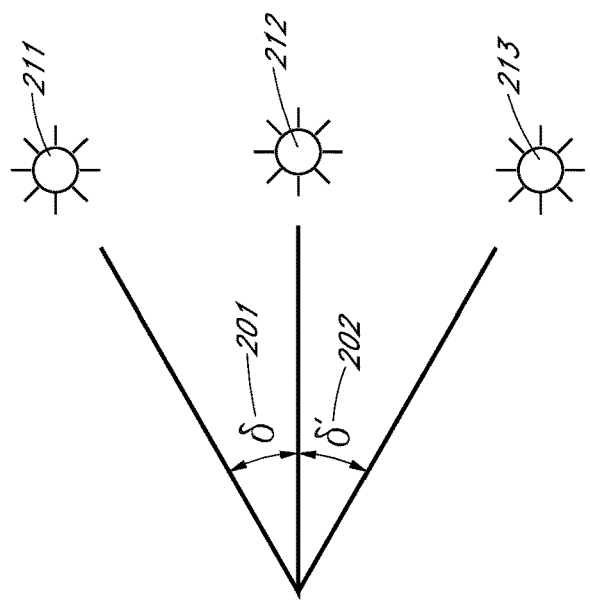
FIG. 2 illustrates a schematic of declination of the sun relative to a reference axis in accord with some embodiments.

FIG. 2 shows angle of declination of the sun relative to a shared reference axis. Positive declination 201 is associated with the sun at position 211 and negative declination 202 is associated with the sun at position 213. In normal course, the equator can serve as the shared reference axis and the angle of declination may be considered positive when the sun is above the equator, e.g., from March 21$^{st}$ to September 21$^{st}$ and may be considered negative when the sun is below the equator, e.g., from September 21$^{st}$ to March 21$^{st}$. Accordingly, the sun is above the equator from March 21$^{st}$ to September 21$^{st}$ during the calendar year and below the equator from September 21$^{st}$ to March 21$^{st}$ of the calendar year. Exact values of the declination of the sun on a given day in the hemispheres can vary from year to year and may be roughly expressed by the following equation (which assumes a 365 day year, places spring equinox at day 81, where n is the day of the year, and assumes a correction may be made for the hemisphere being considered):

$$\delta = \left[\frac{360}{365}(n-81)\right]$$

Figure 3:
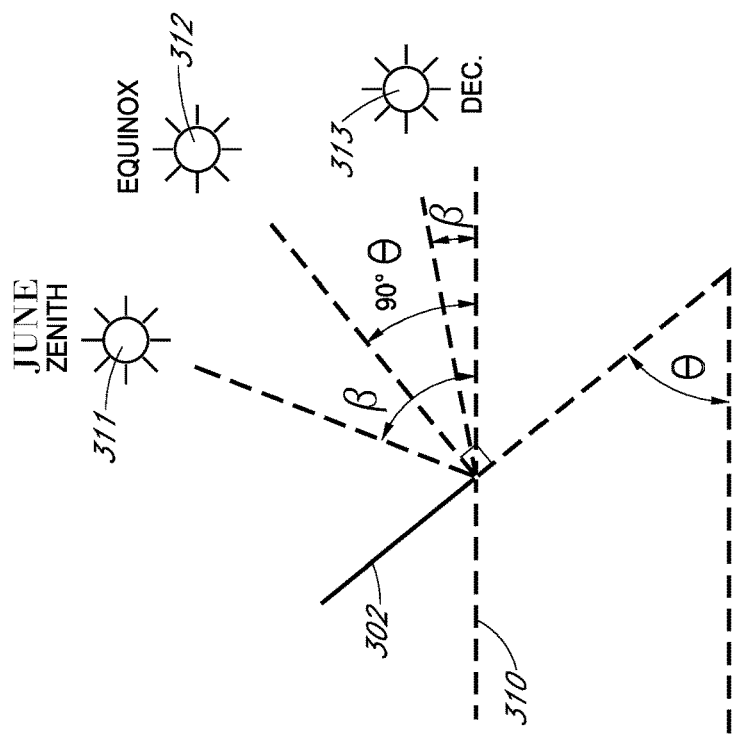
FIG. 3 illustrates a PV module as may be angled relative to an installation latitude and in relation to various positions of the sun during the solar year in accord with some embodiments.

FIG. 3 shows the location of the sun relative to a face of a solar module 302 at different times of the year and how the inclination of the face of the module may be set such that radiation from the sun strikes the face of module at a perpendicular angle at solar noon during the equinoxes. The face of the PV module has an inclination $\theta$ equal to the latitude location of the PV module. As the sun moves through the seasons its angle of declination changes, shown at 311-313, so too does the angle of incidence of radiation striking the face of the solar module. FIG. 3 shows how this angle may change relative a horizontal reference axis 310 depending upon the time of the year and how at solar noon at the equinoxes the angle of incidence is:

90°-$\theta$

Figure 4:
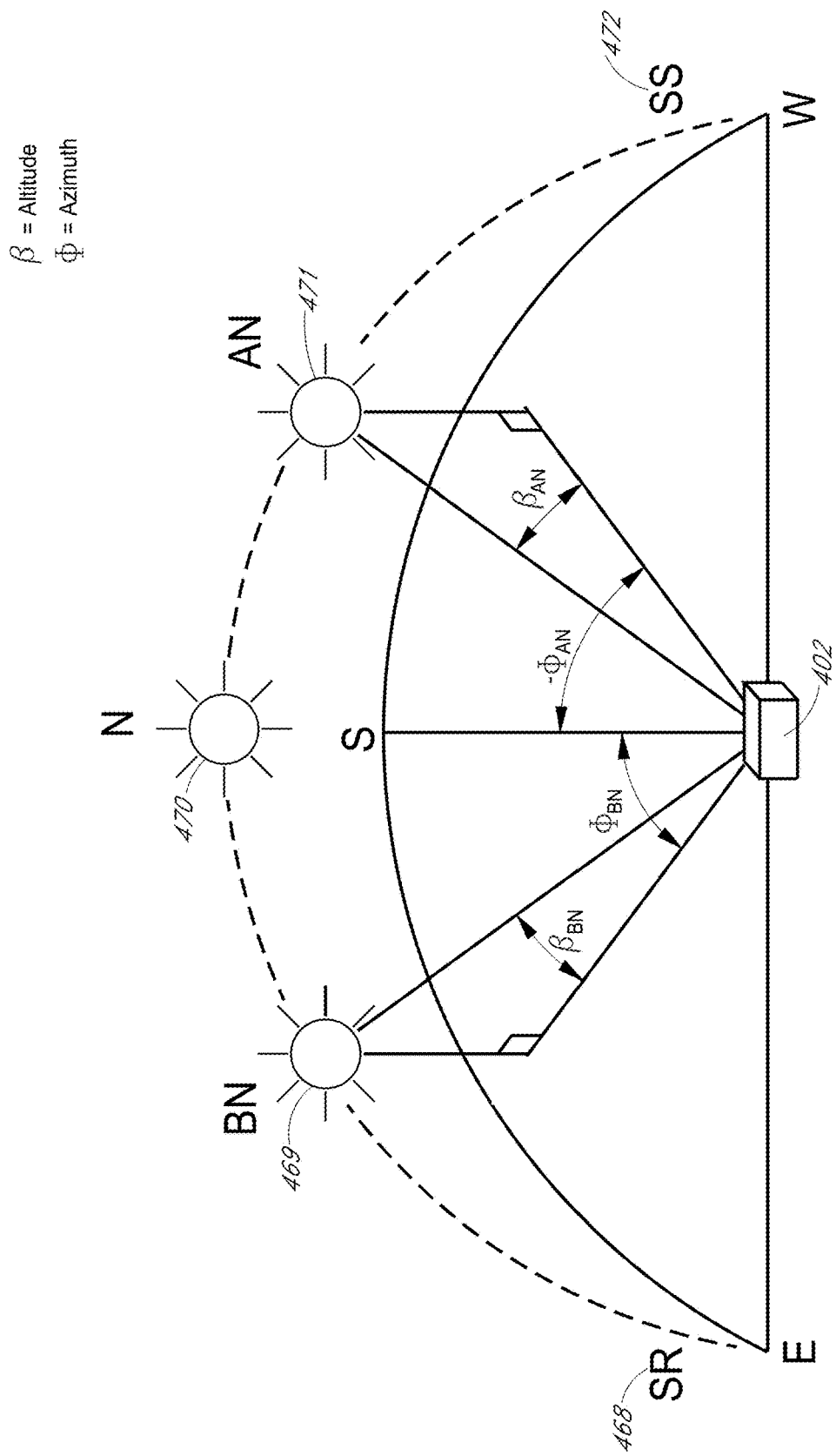
FIG. 4 illustrates the altitude and azimuth of the sun as it moves during the day relative to a stationary reference in accord with some embodiments.

FIG. 4 shows the sun at various positions relative to a stationary reference 402, at various times during the day. At various times during the day the location of the sun may be located by identifying the altitude and azimuth at that time. These may be expressed as angles $\beta$ for altitude and $\phi$ for azimuth. FIG. 4 shows how the altitude angle $\beta$ identifies the angle of the sun in the sky at that moment and how the azimuth angle $\phi$ identifies lateral movement of the sun during the day relative to a fixed reference. Various positions of the sun are shown in FIG. 4: sunrise 468, before noon 469, solar noon 470, after noon 471, and sunset 472. The azimuth angle is negative for periods of time before solar noon and positive for periods of time after solar noon using the reference axis S shown in FIG. 4.

For example, suppose the date is Jan. 9, 2014, that the onset of power production is detected at 8:00 AM (for example, module voltage rises from 0 V or a detectable amount of current flows from the module), and the curtailment of power production (such as when module voltage drops to zero and stays there) is at 7:00 PM. Assume times are in −6 GMT. The solar declination in the northern hemisphere may be computed by:

$$\delta = \left[\sin(23.45°)\sin\left(\frac{360}{365}(d-81)\right)\right]$$

Where d=9 and the result is −22.13 degrees. Solar noon occurs halfway between the sunrise (8:00 AM) and sunset (7:00 PM), which is 12:30 PM. As such, sunrise occurs −5.5 hours from solar noon. Applying the "sunrise equation:"

$\tan(\varphi) = -\cos(\omega_0) \div \tan(\delta)$

In this equation $\omega_0$ is the hour angle from solar noon (in this case, −5.5×15 degrees), and $\phi$ is the latitude. For this example, the resulting latitude is 17.8 degrees. In embodiments, versions for the sunrise equation may also be used for the "apparent sunrise" or "apparent sunset" that correct for refraction and the non-zero size of the solar disk. Likewise, adjustments may be made to the relevant determinations and equations provided above and throughout the disclosure in order to account for which hemisphere the PV modules are located within.

To estimate longitude in degrees, embodiments may calculate the fraction of a day that has passed since noon compared to solar noon. In the above example, solar noon occurs at 12:30+6=8:30 PM GMT, or 20:30 GMT. Solar noon is 12:00 GMT, so 8.5 hours has passed since solar noon GMT. As a fraction of a day, it is 8.5/24=0.354 days. In one day, the earth rotates 360 degrees, so the longitude is approximately 0.354(360 degrees)=127.5 degrees. In embodiments, calculations must preferably be corrected for daylight savings time and may be corrected for other minor effects.

In embodiments, if geographic coordinates are available (either by estimate or other means), then other system information may be inferred, such as the module tilt and azimuth angles. For example, observing the power production over one day (preferably a cloudless day) will yield a power curve. For a given location, tilt angle, and azimuth angle, the shape of the power curve would be distinct. Through curve fitting or other known estimate techniques, embodiments may estimate the tilt angle and azimuth angle. Equations for solar production may be employed. For example, the NREL Solar Advisor Model ("SAM") may be used to conduct calculations that aid in improving the estimates. As above, in embodiments the estimate can be improved over time with more data and in comparison with other modules in the same array.

Accordingly, in embodiments, with knowledge of location and time, the sun's position in the sky (azimuth and altitude angle) can be determined. If other array information is also known (such as tilt and azimuth angle), then the amount of direct and indirect irradiance can be estimated as well. As such, the MLPE module can become a source of solar data that can be used with simulators, quoting software, weather systems, and the like. Knowledge of expected module production could be of interest if an end user or installer feels his or her array is underperforming. Over time, it may yield informative results for PV system management, such as optimal installation angles for various climates.

Figure 5:
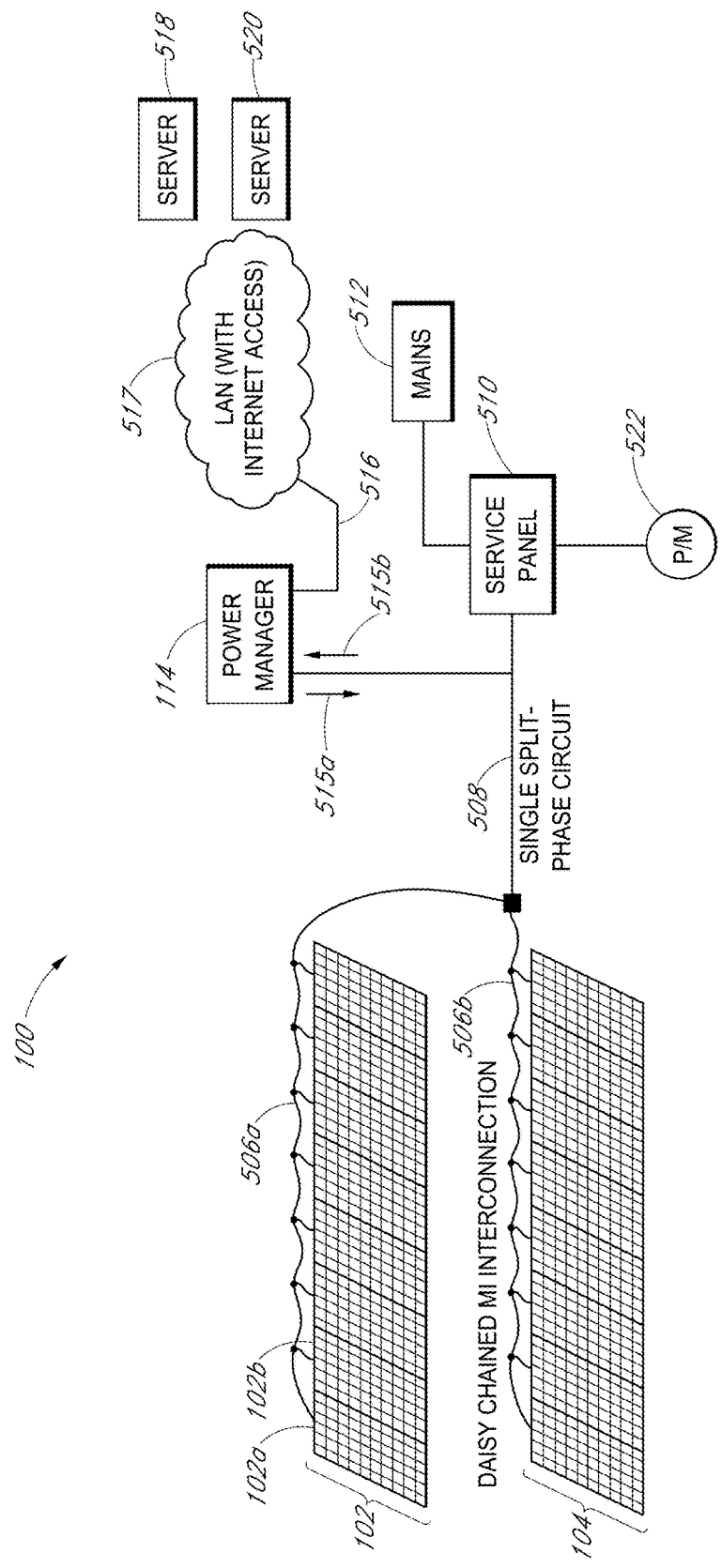
FIG. 5 illustrates a PV system and associated connections in accord with some embodiments.

FIG. 5 shows a schematic of the PV system of FIG. 1 and further components that may be directly and indirectly associated with the PV system 100. PV system 100 includes MLPE devices to generate power from PV modules and supply this power for use. The MLPE devices allow for the capability to monitor module-level data such as the voltage, current, and temperature of a given PV module.

For example, as shown in FIG. 5, PV system 100 shows a set of PV modules 102 and a set of PV modules 104. Additional sets of PV modules may be included in PV system 100, and two sets are shown for clarity. Each set includes a number of PV modules. This number may vary and is not fixed according to the disclosed embodiments. Each PV module includes PV cells. The PV cells may collect solar energy to generate power. In FIG. 5, PV modules $102_a$ and $102_b$ are shown for reference purposes. When referring to "PV module 102a" or "PV module 102b" in the disclosure below, this reference includes any PV module within any PV module set.

PV modules 102 and 104 also include converters connected to the PV cells to convert the collected energy into useable power. The converters may be microinverters, ACPV modules, dc-ac converters, dc-dc optimizers, and the like. PV system 100 may implement daisy chained interconnections between the sets of PV modules to collect the power. As shown in FIG. 5, interconnection 506a may be coupled to PV modules 102 and interconnection 506b may be coupled to PV modules 104. Other interconnections may be used for other sets of PV modules.

Power collected by interconnections 506a and 506b is provided to single split-phase circuit 508 to deliver the power to a main power line 512. A service panel 510 may be coupled between single split-phase circuit 508 and main power line 512. Service panel 510 may be on location with PV modules 102 and 104, and allow for maintenance, repair, adjustment and the like of components within PV system 100. An electric meter 522 also may be coupled to PV system 100.

Gateway device 114, or gateway arrangement, also is coupled to single split-phase circuit 508 to monitor data and information coming from PV modules 102 and 104. As noted above, PV modules 102 and 104 along with their associated converters, microinverters and the like may be referred to as MLPEs. Gateway 114 may aggregate data from these components and analyze the data for performance, reliability, customer service, and the like, to monitor or improve the performance of PV system 100. Gateway 114 may collect site data and module-to-module comparison data in performing these functions. Data or messages received by gateway 114 may be shown by 505a, while transmitted messages or data may be shown by 505b. Gateway 114 also may log timestamp data. In some embodiments, gateway 114 may be referred to as a power manager and may be resident in a single device or across multiple devices as both circuit and/or software adaptations.

The data collected by gateway 114 may be accessed locally at PV system 100 or via the Internet. Thus, in some embodiments, gateway 114 is coupled to a local area network ("LAN") connection 516 to access a LAN 517. LAN connection 516 may be a wired connection, or, alternatively, a wireless connection that uses appropriate protocols to communicate with LAN 517. Using LAN connection 516 and LAN 517, gateway 114 may send data to destinations not physically located with PV system 100. In some embodiments, gateway 114 may send collected data on PV system 100 to servers 518 and 520. In a sense, gateway 114 connects the PV modules and other MLPE devices to the Internet. Additional servers and other components having IP addresses may be included, but not shown for clarity.

Gateway 114 may perform various functions disclosed herein. Gateway 114 may also send the data to another device, such as server 518 or 520, to perform functions for PV system 100. Gateway 114 then may facilitate the performance of the functions based on the analysis of the devices outside PV system 100.

Several functions and processes are disclosed below that may be advantageously deployed in gateway 114. Implementation in gateway 114 may be preferred as it saves steps and time in communicating with PV modules 102 and 104, or other MLPEs, within PV system 100. Communication may not be required with devices, such as servers 518 and 520, not located in the vicinity of PV system 100. Gateway 114 may address any issues or performance problems within PV system 100 directly.

Gateway 114 may include a processor to execute instructions. Gateway 114 also may include a memory to store the instructions. In some embodiments, the memory may be a read-only memory ("ROM") or a random access memory ("RAM"). Gateway 114 also includes one or more input/output ports to receive and transmit data to the MLPE devices within PV system 100 and to the network. In some embodiments, gateway 114 acts as a computer and gateway 114 may communicate with PV modules 102 and 104 via circuit 508 and interconnections 506a and 506b using these components as bus.

According to some embodiments, remote monitoring of PV system 100 may occur. The remote monitoring may be used to determine, in addition to geospatial location, if a PV system is functioning properly by examining the exported power production relative to how much the PV system is expected to be producing. The consumption of power by a load also may be important. In some embodiments, the load may be a household, residential or commercial power system. As this data is logged, patterns may emerge over time for power production and consumption. Weather patterns, for example, may be determined by the logged data over a period of time.

In some embodiments, gateway 114 may be associated with an electric meter 522 within service panel 510. Gateway 114 may aggregate the values over a period of time, such as a day, week, month and the like. The remote server may include software and algorithms to perform analysis on the aggregated values. For example, the algorithms may compare the aggregated values to historical or predicted values for power consumption for a period of time. The remote server may be associated with a utility or other service.

The software and algorithms may search for the anomalies in the total power consumption or other features described herein. For example, a process may compare the power consumption to historical consumption values to detect an anomaly. Gateway 114 may aggregate data and report it to a service, such as a utility vendor, where it may be stored in server 518 or 520 for use in embodiments.

PV systems with MLPE, such as systems with microinverters, ACPV modules, or dc-dc optimizers, offer the capability to monitor module-level data such as the voltage, current, and temperature of a given PV module. Many MLPE systems couple to a gateway or communications unit such that MLPE data can be aggregated and analyzed for performance, reliability, customer service, etc. These module data can normally be accessed locally (at the site) or via the Internet. Data from more than one module, typically numerous modules, is also available in an MLPE system. As such, site data and module-to-module comparison data are also available and of interest. Furthermore, the gateway device (if not also the MLPE devices themselves) would typically log timestamp data.

At any given time, from one or more of the voltage, current, and temperature data of PV module (collectively, the module telemetry) embodiments can infer normal irradiance incident upon the module from the known i-v characteristics of the module. Based on timestamp and geographic location (e.g., GPS coordinates), embodiments can calculate the location of the sun in the sky (azimuth angle and altitude angle), based on telemetry equations. Likewise, if the sun location and the module telemetry are known, embodiments can calculate the geographic location of a module as well as its orientation and tilt.

Figure 6:
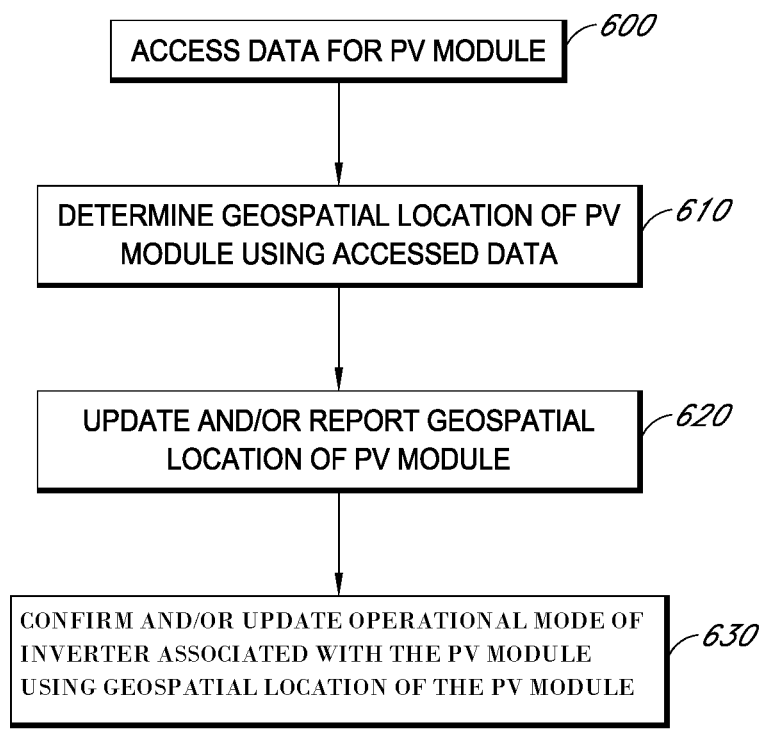
FIG. 6 illustrates a flowchart for geospatial location of PV modules in accord with some embodiments.

FIG. 6 shows a process in accord with embodiments. As shown at 600 the process may include access data for a PV Module. This access may be conducted on site as well as remotely. At 610, a determination of the geospatial location of the PV module, using accessed data, may be conducted. At 620 an update and/or report of geospatial location of PV module may be conducted, and at 630, confirmation and/or update of an operational mode of an inverter associated with PV module, using geospatial location of the PV module, may be carried out. This process may be conducted in a single microprocessor as well as across several microprocessors. It may be performed in other ways as well.

Figure 7:
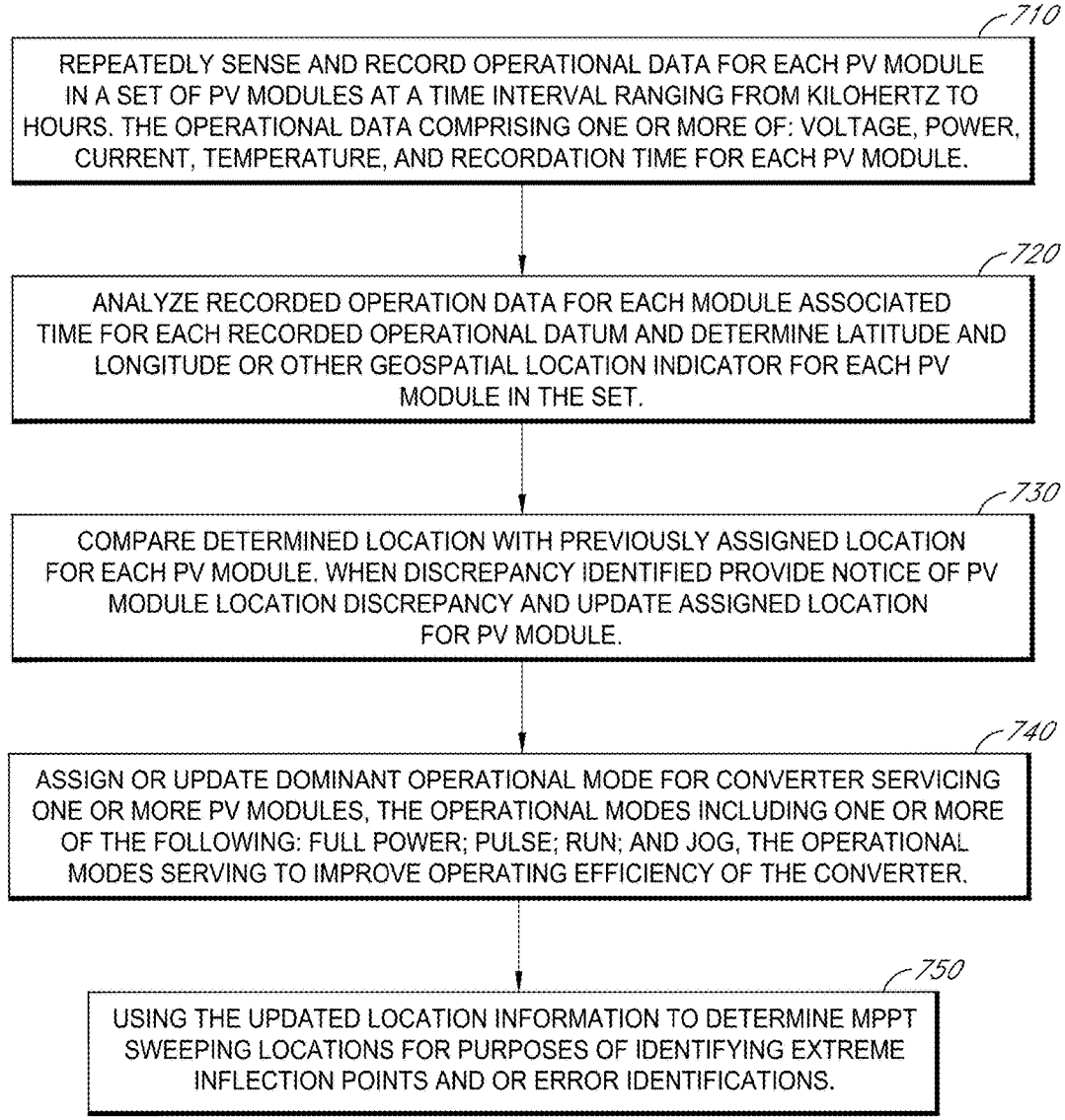
FIG. 7 illustrates a flowchart for geospatial location of PV modules in accord with some embodiments.

FIG. 7 shows a process in accord with embodiments. Step 710 shows how repeated sensing and recording operational data for each PV module in a set of PV modules at a time interval ranging from kilohertz to hours may be conducted. Here, the operational data may comprise one or more of: voltage, power, current, temperature, and recordation time for each PV module. As shown at 720, recorded operational data may be analyzed for each module. The associated time for each recorded operational datum and determine latitude and longitude or other geospatial location indicator for each PV module in the set may be part of the operational data. As shown at 730, a comparison of the determined location with a previously assigned location for each PV module may be conducted. When a discrepancy is identified, a notice of PV module location discrepancy may be provided and an update assigned for the PV module.

Embodiments may also include assigning or updating dominant operational modes for a converter servicing one or more PV modules as shown at 740. These operational modes may include one or more of the following: full power; pulse; normal run; and jog and may be set to improve operating efficiency of an associated converter. These power modes may be controlled locally or remotely to adjust reactive power offered by an inverter or other converter to the mains power grid.

In these various operational power modes, power cycles may be occasionally or periodically paused so that power is not continuously dispensed into the power grid. The jog mode for example, which may include sporadic power dispensing into the power grid, may be controlled with commanded phase shifts and bus voltages that serve to manage the average power bus voltage and the reactive power presented into the power grid.

Full power modes for an associated converter may include an expectation of receiving a continuous or near continuous maximum or near maximum voltage for a sustainable period of time and converting that voltage to a target power output during the entire time for dispensing into the power grid. Pulse mode of operation may include operating the converter in short spurts or pulses, where the inverter generates a sinusoidal output pulse waveform including a plurality of pulses having a determined pulse width. Pulse mode may be selected in response to inverter output power being less than a reference threshold. In embodiments, the pulse width may be less than half of a wave period of a full cycle sinusoidal waveform and may be determined as a function of, for example, output power of the inverter, a grid voltage, or using other criteria.

Normal run mode may involve a standard run mode of the inverter where a full cycle sinusoidal output waveform is generated by the inverter and where output power is equal to or greater than a reference output power threshold.

Embodiments may also include using the updated location information to determine MPPT sweeping locations for purposes of identifying extreme inflection points and/or error identifications. This MPPT sweeping is shown at 750.

In these processes, as well as other embodiments, an analysis of the data can be used to calculate or approximate site information. For example, the onset or curtailment of power production may indicate a sunrise or sunset, respectively. For example, assuming the gateway has timestamp information, then sunrise and sunset times can be matched against known sunset and sunrise times versus geographic location. Analyzing multiple sunrise/sunset events can produce multiple approximations of latitude and longitude in embodiments.

Filtering these approximations, using analog or digital or both techniques, may also be employed and may lead to progressively more accurate assessment of latitude and longitude. This filtering may include mathematical averaging techniques, low-pass filtering techniques, median filtering techniques, or any technique designed to remove "noise" from the data stream. Noise may be introduced by weather fluctuations, irregular shading, sensor offsets and scaling errors, or any other unknown or unpredictable factor, including changing irradiance.

As mentioned, estimates can be repeated each day and filtered or averaged to yield a more consistent number. Obviously incorrect estimates can be eliminated by median filtering, for example. In a system of MLPE modules, the estimates from various modules may be compared and averaged or filtered in order to improve the overall system estimate.

In embodiments, the sunrise and sunset times may be somewhat crudely sampled (such as with a 5-minute polling operation) for a given module. Preferably, not all modules will necessarily be sampled at the same time. As such, the estimated sunrise or sunset times of different modules may be analyzed to determine which apparently occurred earliest or latest, as the case may be. This may further improve the estimate of the time in embodiments.

Other available data may also be used to improve the estimate of location or to confirm reasonableness of the location estimate. For example, the gateway device's IP address may provide an indication of location. As another example, the installer may have manually entered a ZIP code or partial address. Further, the installer may have determined and entered a geolocation (e.g., GPS location). Still further, overall power or energy output of the array may be compared to other areas thought to be in the same geographic area.

In an extreme case, over time, modules in different parts of the array will develop slightly different measurements of latitude and longitude. Embodiments may provide resolution of small differences in module locations and feed this information into an array map or a requestor or other remote location. As such, the relative location of each module could be estimated or confirmed.

Figure 8:
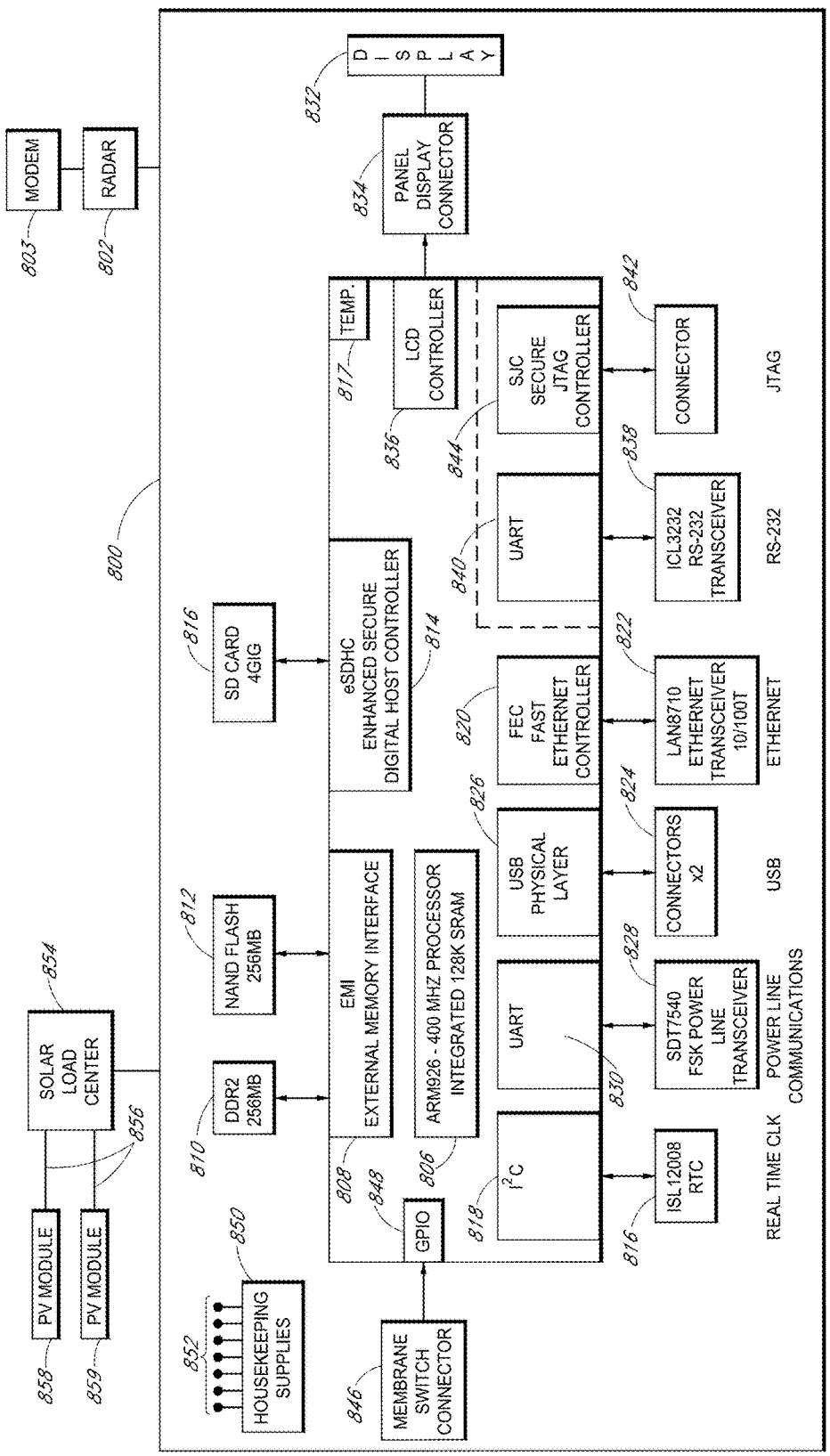
FIG. 8 illustrates a power manager gateway and other components as may be employed by a PV system in accord with some embodiments.

FIG. 8 depicts a block diagram of gateway 800 according to some embodiments. Gateway 800 may relate to gateways 114 disclosed above and may perform some or all of the geospatial location functionality disclosed herein. The arrangement shown in FIG. 8 is an example arrangement of a gateway and its relation in a PV system. Other embodiments may implement different arrangements while providing the functionalities disclosed herein.

Gateway 800 may serve as the communications hub of a PV solar array. As noted with the other gateways disclosed herein, gateway 800 continuously monitors the performance of the MLPE devices in a PV system, such as PV system 100. Communications between gateway 800 and associated MLPE devices may take place over AC wiring. Thus, no additional data cabling should be needed, though data cabling may be used in conjunction with gateway 800.

Gateway 800 may serve as the internet gateway for a PV system. Gateway 800 also may implement different power options, such as using a standard wall outlet, a 12 volt DC source or directly into the service panel for the PV system. Referring back to FIG. 5, the gateway may be plugged into service panel 510. Gateway 800 may be an outdoor-rated enclosure that includes external protection against the elements, such as falling rain, sleet, snow and ice formation. Gateway 800 also includes indoor protection against dripping water.

Gateway 800 may use at least two different protocols to communicate. One protocol may be a known internet protocol for communications between gateway 800 and the web portal. Gateway 800 may communicate over a network by connecting to a router 802, which is connected to a modem 804. Another protocol may be a power line communications ("PLC") protocol for communicating between gateway 800 and the microinverters within the MLPE devices.

Gateway 800 may include the following components that act as a single board computer to provide the functionality disclosed above. Gateway 800 includes a processor 806. Preferably, processor 806 is a 32 bit, 400 MHz advanced reduced instruction set computing ("RISC") machine ("ARM") processor, but it is not limited to these specifications. Alternatively, processor 806 may be a complex instruction set computing ("CISC") processor. Processor 806 is capable of supporting a full operating system, such as LINUX™ or WINDOWS™.

Gateway 800 also includes an external memory interface 808 that helps processor 806 retrieve data, such as instructions or stored data, from dynamic RAM 810 and flash memory 812. Dynamic RAM 810 preferably is a double data rate ("DDR") dynamic RAM, and may have a memory size greater than 128 MB. Flash memory 812 may be greater than 128 MB as well, and, preferably, is a NAND type flash memory. Gateway 800 also may include an enhanced secure digital host controller 814 to read secure digital ("SD") memory card 816. Preferably, SD memory card 816 has a capacity greater than 2 GB.

Gateway 800 includes a real time clock 816 coupled to inter-integrated circuit 818. Inter-integrated circuit 818 may act as a single-ended, serial computer bus to attach peripherals to processor 806. Real time clock 816 may have a super cap backup with about a week or more duration. Gateway 800 also includes a temperature sensor 817. Preferably, gateway 800 has a nominal power consumption of less than 2 watts, or even less than 1 watt.

Gateway 800 also includes several user interfaces. For example, fast Ethernet controller 820 may receive Ethernet transceiver 822. Preferably, Ethernet transceiver 822 is a 10/100 baseT Ethernet port. Gateway 800 may include at least two universal serial bus ("USB") ports 824. One port may be a boot port, while another port may be a customer accessible port. USB ports 824 connect to USB physical layer 826.

PLC communications may occur through power line transceiver 828. PLC communication may be accessible through the power cord. Power line transceiver 828 may be coupled to universal asynchronous receiver/transmitter 830. Gateway 800 may implement a ½ duplex, synchronous communication mode for PLC communications. Power line transceiver 828 may implement a frequency shift key ("FSK") modulation with a carrier of 110 KHz.

Gateway 800 also includes a display 832. Display 832, in some embodiments, may be a 4 line by 20 character liquid crystal display ("LCD") device. Display 832 may connect to the logic of gateway 800 using panel display connector 834 and LCD controller 836. Processor 806 may instruct the data or other information be displayed in response to commands.

RS-232 transceiver 838 may be used for serial communication transmission of data to and from gateway 800. RS-232 transceiver 838 may connect to serial port 840, which may be a universal asynchronous receiver/transmitter port. Gateway 800 also includes a joint test action group ("JTAG") connector 842 coupled to a secure JTAG controller 844. The JTAG configuration may be used as a debug port implementing a serial communications interface.

Membrane switch connector 846 is coupled to gateway 800 via a general-purpose input/output (GPIO) pin 848. These components may serve as an additional digital control line for gateway 800.

Housekeeping power supply 850 may provide power for the various components within gateway 800. Housekeeping power supply 850 includes circuitry to convert input power from either an AC voltage or a DC voltage into values appropriate for the items disclosed above. The housekeeping output voltages may be supplied to the components via housekeeping supply rails 852. Each rail may provide a different voltage depending on the specifications for the components.

For example, one housekeeping supply rail 852 may provide a 12 volt switched voltage for PLC communications components. Another housekeeping supply rail 852 may provide 5 volts for the USB connectors 824. A housekeeping supply rail 852 may provide 3.3 volts for processor 806, and the flash, Ethernet and SD components. A housekeeping supply rail 852 also may provide 1.8 volts for the DDR components. Other voltages may include 1.5 volts, 1.45 volts and −1.3 volts, and any other voltages needed to operate gateway 800.

Gateway 800 may be connected to a PV system having PV modules. Gateway 800 may communicate through a network, such as an internet connection, using router 802. IP data is sent from gateway 800 to router 802. Router 802 may transmit the IP data over the network using a modem 803. In other embodiments, the router and modem may be embedded within gateway 800 so that the gateway may communicate directly over the network.

Gateway 800 also may be connected to a solar load center 854. Solar load center 854, in turn, may be connected with a plurality of PV modules, shown as PV modules 858 and 859. Any number of PV modules may be connected to solar load center 854. Communications from gateway 800 to the PV modules may occur over PLC communication lines 856. As disclosed above, the disclosed embodiments may implement a PLC communications protocol to facilitate these communications.

Figure 9:
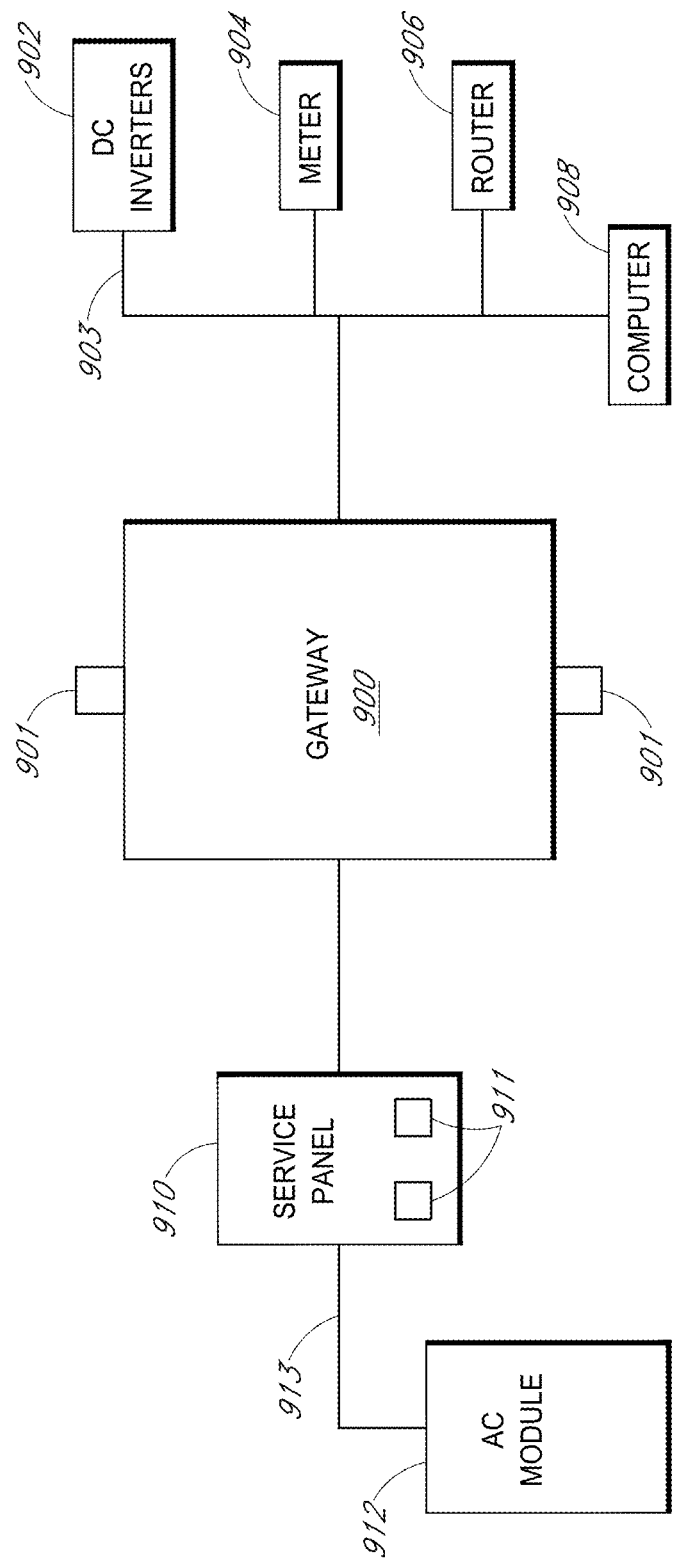
FIG. 9 illustrates a power manager gateway and other components as may be employed by a PV system in accord with some embodiments.

FIG. 9 depicts a configuration of a gateway 900 connected to a PV system according to some embodiments. Gateway 900 may correspond to gateways 800 or 114 disclosed above. Gateway 900 may be mounted with a bracket 901.

Gateway 900 may be connected to service panel 910. Service panel 910 may house consumption current transformers 911. Service panel 910 may be connected to AC module 912 with AC module connection 913. Thus, AC voltage may be supplied to gateway 900 via service panel 910 as current transformers 911 are connected with wires to connectors in the gateway. Current transformers 911 provide consumption monitoring.

Gateway 900 also may be connected to PV modules 102 or 104 within a PV system 100, shown as inverters 902 in FIG. 9. Cables 903 may correspond to the type of inverter used. These connections allow gateway to communicate to the inverters and to collect data on the inverters and to provide the functions disclosed above.

Gateway 900 also may be connected to meter 904. Router 906 also is connected to gateway 900. Preferably, an Ethernet cable is connected between the gateway and the router. Computer 908 may be connected to gateway 900 to provide help during installation and to troubleshoot problems. Computer 908 may run an application to setup communication, check firmware, discover devices within the PV system, verify device operation and commission the site of gateway 900.

As noted above, information regarding sun location, module information, and site location could be used to improve the performance of the MLPE device itself. For example, ACPV modules manufactured by SunPower have a "pulse mode" operation. Pulse mode is enabled when the input power to the ACPV microinverter is below a threshold (such as 30% rated power). With knowledge of the sun's location and expected irradiance, the microinverter could "know" whether it should be in pulse mode (at low power) or not, rather than relying just on input power measurements alone. If the microinverter is entering pulse mode at times where power is expected to be high, this may indicate natural shading or an "unnatural" problem that can be flagged for potential correction.

One can also envision improved power point tracking operations. For example, if an MLPE module "knows" it will be shaded or operating in a lower power regime, for example, it could adapt its MPPT controller to that situation. In one case, at low power levels, microinverters may "sweep" the power curve periodically to detect possible multiple extrema. If it were known in advance that the multiple extrema already exist, the sweeping function would be unnecessary. One could also envision "high sun" and "low sun" parameters for better tuning an MPPT algorithm.

Figure 10:
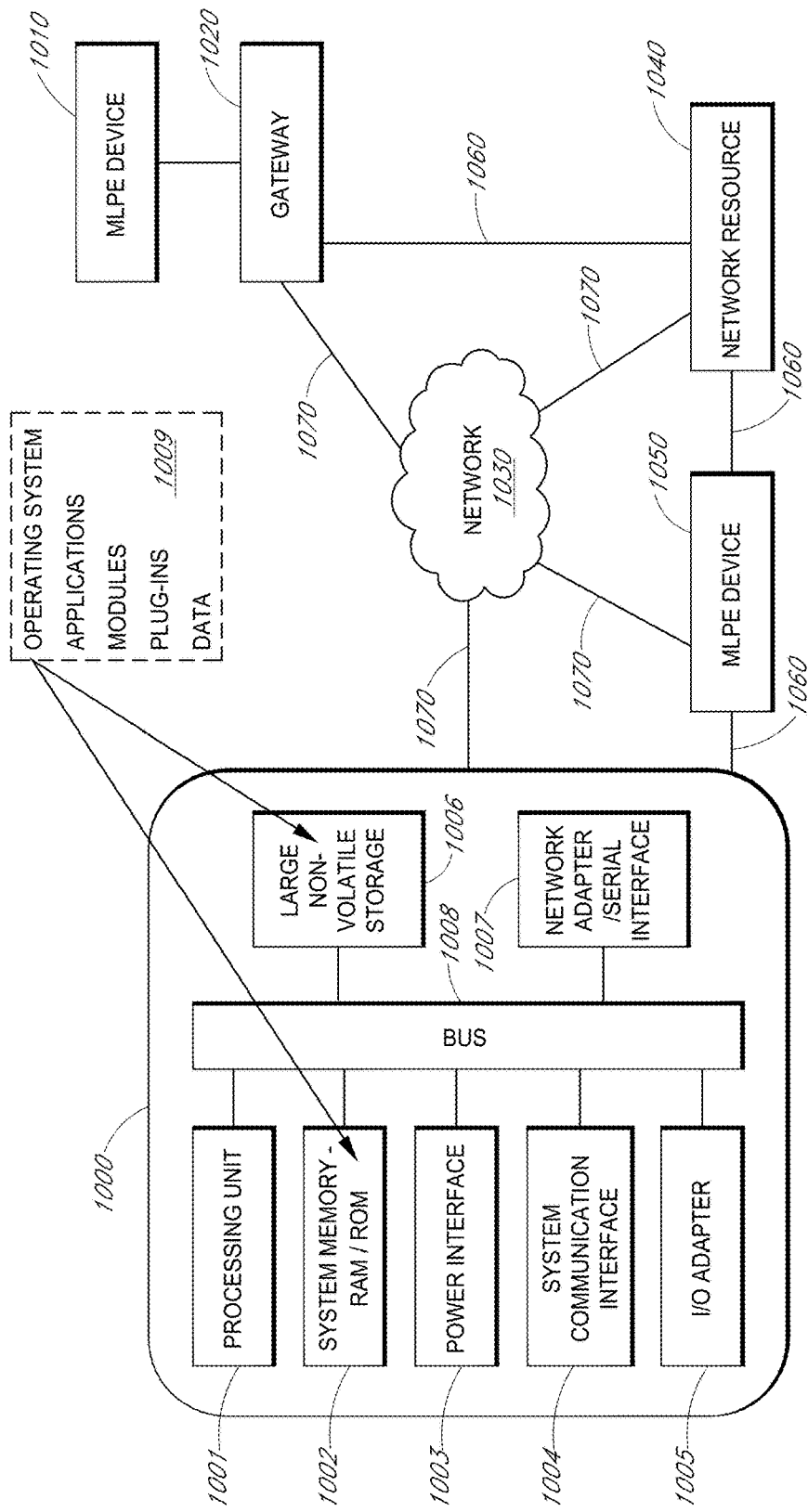
FIG. 10 illustrates a schematic of gateway arrangements, MLPE devices, and network resources as may be employed in accord with some embodiments.

FIG. 10 illustrates a schematic of gateway arrangements, MLPE devices, and network resources as may be employed in embodiments. FIG. 10 shows a gateway arrangement 1000 as a single device that includes a CPU 1001, a main memory 1002 connected to a bus 1008. Other gateway arrangements may be comprised of several devices. The CPU 1001 may employ various architectures and is preferably based on 32 bit or 64 bit architecture. FIG. 10 also shows the gateway employing software 1009 for loading or storage on the memory 1002 and the non-volatile large storage 1006. This storage 1006 may also be connected to the bus 1008 like the power interface 1003, the system communication interface 1004, the I/O adapter 1005, and the network adapter 1007. Network 1030 is shown to be reachable by the gateway 1000 as well as having communication pathways to the MLPE device 1050, the network resource 1040, and the gateway 1020. MLPE device 1010 is shown with a direct arrangement to the Gateway 1020 and without a direct communication link to the network 1030. Direct communication links are also shown between the gateway 1020 and the network resource 1040 and the MLPE device 1050 and the gateway 1000. Communication pathways to and from the network are indicated by lines 1070 while communication pathways without using the network are shown with lines 1060.

In the gateway, a display or other user interface may be connected to the bus 1008 via the I/O adapter 1005. Such a display may be used for management of the gateway, for reaching information on the gateway, for reaching information available to the gateway and for other reasons as well. The storage 1006 may be a hard disk or solid state drive. The I/O adapter may also accommodate keyboards, mice, or other user interface peripherals.

An operating system, applications providing a processing environment, modules for performing embodiments taught herein, and plug-ins for making adjustments to any of the foregoing may all be stored along with data, on the storage 1006 and the memory 1002 for use by the processor 1001. This software may configure the processor for performing aspects of the invention. The processor may also be an ASIC specifically configured without the need to load software during a boot cycle in order to perform aspects of embodiments.

The network adapter 1007 may employ the Ethernet® protocol as well as other communication protocols and may serve to physically connect the gateway to a communication line and therein provide network 1070 access or a link to an MLPE device, for example.

The power interface 1003 may be arranged with outputs of a PV module or PV cells. The gateway may use this interface for monitoring purposes as well as for its own power supply.

The MLPE devices 1010 and 1050 may each employ some or all of the components of the gateway 1000 with these components being configured and tailored to perform the specific functions of the MLPE devices. In operation, the MLPE devices and the gateways may communicate directly with each other as well as through the Network 1030. These communications may include exchange of data in order to carry out the processes and functions of embodiments. Either or both of the MLPE devices and the gateway may also be connected to network resources either directly or through the network 1030. These network resources may provide additional services such as weather information, both historical and current conditions, power grid status and operational activity, historical and present conditions for other gateways or MLPE devices, and other functionality consistent with the embodiments provided and described herein. Thus, the network resources 1040 can provide additional sources of information for the MLPE devices and the gateways to assist them during operation and for management and improvement purposes.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for remotely verifying geographic coordinates of installed and operational photovoltaic cells and using the coordinates, the method comprising:
   during a first predetermined period of time, for a first array of photovoltaic cells, one or more microprocessors repeatedly identifying and recording one or more of: a voltage output, a power output, a current output, and a cell temperature of the first array of photovoltaic cells;
   one or more microprocessors identifying and associating a time of day to the first predetermined period of time;
   during a second predetermined period of time, for the first array of photovoltaic cells, one or more microprocessors repeatedly identifying and recording one or more of: a voltage output, a power output, a current output, and a cell temperature of the first array of photovoltaic cells;
   one or more microprocessors identifying and associating a time of day to the second predetermined period of time;
   one or more microprocessors using the recorded outputs and identified and associated time of day for the first period of time and the second period of time to determine the latitude and the longitude of the first array of photovoltaic cells; and
   one or more of the microprocessors operating a photovoltaic module of the first array of photovoltaic cells using an operational setting determined using the determined latitude and longitude of the first array of photovoltaic cells.

2. The method of claim 1 further comprising comparing the determined latitude and longitude of the first array of photovoltaic cells with a geographic location of the first array identified by an installer of the first array.

3. The method of claim 1, further comprising using two or more recorded outputs, and identified and associated time of day for the first period of time and the second period of time, to determine the latitude and the longitude of the array of photovoltaic cells and to determine an installation angle of the array of photovoltaic cells.

4. The method of claim 1, further comprising remotely comparing the difference between the determined latitude and longitude of the first array of photovoltaic cells with coordinates previously associated with the first array of photovoltaic cells.

5. The method of claim 1, further comprising adjusting the operating mode of a transformer circuit from a first output mode to a second output mode, the second output mode tailored to accommodate expected solar radiation for the determined latitude and longitude of the first array of photovoltaic cells.

6. The method of claim 5 wherein the output modes are selected from modes comprising: a full power mode, a pulse mode, a jog mode, and a run mode.

7. The method of claim 1 further comprising:
   during a first predetermined period of time, for a second array of photovoltaic cells, repeatedly identifying and recording two or more of: a voltage output, a power output, a current output, and a cell temperature of the second array of photovoltaic cells;
   identifying and associating a time of day to the first predetermined period of time;
   during a second predetermined period of time, for the second array of photovoltaic cells, repeatedly identifying and recording two or more of: a voltage output, a power output, a current output, and a second array cell temperature;
   identifying and associating a time of day to the second predetermined period of time;
   using recorded outputs, recorded temperature, and identified and associated time of day for the first period of time and the second period of time to remotely determine the latitude and the longitude of the second array of photovoltaic cells; and
   comparing recorded outputs, recorded temperature, and identified and associated time of day for the first period of time and the second period of time for each of the first array of photovoltaic cells and the second array of photovoltaic cells to remotely determine if the first array or the second array is operating below one or more predetermined performance targets.

8. The method of claim 1 wherein the sampling rate during the first period of time and the second period of time is 1 kilohertz or faster.

9. The method of claim 1 further comprising:
   using one or more microprocessors to remotely determine the beginning time of sunrise radiation exposure for the first array by using a filter to filter out errant previously identified outputs for the first array or for another array of photovoltaic cells.

10. A method for managing operation of an array of photovoltaic cells, the method comprising:
    within one or more microprocessors, using repeatedly identified and stored outputs of a first array of photovoltaic cells to remotely locate the geographic position of the first photovoltaic array; and
    within one or more microprocessors, using the located geographic position to identify expected multiple extrema in a maximum power point tracking (MPPT) operation for the first photovoltaic array and to use the identified expected extrema during MPPT operation.

11. The method of claim 10 wherein the MPPT operation is performed at a module level power electronics (MLPE) device and wherein the MLPE is configured to periodically sweep a power curve for detection of multiple extrema.

12. The method of claim 10 wherein expected multiple extrema indicate high-sun and low-sun parameters for tuning the MPPT operation.

13. The method of claim 10 wherein the identified and stored outputs comprise the voltage output, the power output, and the current output, for the first array of photovoltaic cells,
wherein these outputs are measured at a gateway or a microinverter and
wherein the sampling rate for the outputs, and the sampling rate for cell temperature of the first array of photovoltaic cells, conducted at the gateway or the microinverter, is once every fifteen minutes or faster.

14. The method of claim 10 further comprising:
comparing the located position of the first array with a previously indicated position, and
wherein using the output for a first array of photovoltaic cells to remotely locate the geographic position of the first photovoltaic array includes storing a plurality of sampled and recorded outputs and using this plurality of stored data along with associated times for the data to remotely locate the geographic position of the first photovoltaic array.

15. The method of claim 10 further comprising:
selecting a power operation mode from among several power operation modes of a microinverter associated with the first photovoltaic array using the remotely located geographic position of the first photovoltaic array, and
wherein the identified and stored outputs comprise voltage output, power output, current output, and cell temperature of the first array of photovoltaic cells.

16. A system for managing operation of an array of photovoltaic cells, the system including stored instructions which cause one or more processors to perform functions comprising:
using repeatedly sampled and stored data of a first array of photovoltaic cells to remotely locate the geographic position of the first photovoltaic array; and
using the located geographic position to identify expected multiple extrema in a maximum power point tracking (MPPT) operation for the first photovoltaic array and to use the identified expected multiple extrema during MPPT operation for the first photovoltaic array,
wherein the data comprises one of more of the following: voltage output, power output, current output, and cell temperature.

17. The system of claim 16 wherein the MPPT operation is performed at a module level power electronics (MLPE) device and wherein the MLPE is configured to periodically sweep a power curve for detection of multiple extreme.

18. The system of claim 16 wherein expected multiple extrema indicate high-sun and low-sun parameters for tuning the MPPT operation.

19. The system of claim 16 wherein one or more of the voltage output, the power output, the current output, and the cell temperature for the first array of photovoltaic cells is measured at a gateway or a microinverter and wherein the sampling rate for the outputs or the temperature or both, at the gateway or the microinverter, is once every fifteen minutes or faster.

20. The system of claim 16 wherein the stored instructions also cause one or more processors to perform functions further comprising:
selecting a power operation mode from among several power operation modes of a microinverter associated with the first photovoltaic array using the remotely located geographic position of the first photovoltaic array.

* * * * *